(12) United States Patent
Gaur et al.

(10) Patent No.: US 8,906,336 B2
(45) Date of Patent: *Dec. 9, 2014

(54) BLAST FURNACE METALLURGICAL COAL SUBSTITUTE PRODUCTS AND METHOD

(76) Inventors: Siddhartha Gaur, Plano, TX (US); Vibha Bansal, Plano, TX (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/432,346

(22) Filed: Apr. 29, 2009

(65) Prior Publication Data

US 2010/0037729 A1 Feb. 18, 2010

Related U.S. Application Data

(63) Continuation-in-part of application No. 10/824,263, filed on Apr. 13, 2004, now Pat. No. 8,110,169, which is a continuation of application No. 09/663,115, filed on Sep. 15, 2000, now Pat. No. 6,719,956.

(51) Int. Cl.
| | | |
|---|---|---|
| *C01B 31/02* | (2006.01) | |
| *C04B 35/622* | (2006.01) | |
| *C04B 35/626* | (2006.01) | |
| *C04B 35/52* | (2006.01) | |
| *C10B 57/04* | (2006.01) | |

(52) U.S. Cl.
CPC ............ *C04B 35/52* (2013.01); *C04B 35/62204* (2013.01); *C04B 2235/422* (2013.01); *C04B 35/62213* (2013.01); *C04B 35/6267* (2013.01); *C04B 35/62209* (2013.01); *C04B 2235/48* (2013.01); *C10B 57/04* (2013.01); *C04B 2235/604* (2013.01)
USPC ......................................... 423/445 R; 44/505

(58) Field of Classification Search
USPC ........................................ 44/505; 423/445 R
See application file for complete search history.

(56) References Cited

U.S. PATENT DOCUMENTS

| | | | |
|---|---|---|---|
| 3,720,351 A | 3/1973 | Coulter et al. | |
| 3,867,499 A | 2/1975 | Morgan | |
| 3,971,639 A | 7/1976 | Matthews | |
| 3,971,654 A | 7/1976 | Mancke | |
| 4,032,476 A | 6/1977 | Murty | |
| 4,101,354 A | 7/1978 | Shaffer | |
| 4,152,119 A | 5/1979 | Schulz | |
| 4,181,505 A * | 1/1980 | De Vries et al. ................ | 51/307 |
| 4,183,731 A | 1/1980 | Eisel | |
| 4,187,079 A | 2/1980 | Weber et al. | |
| 4,213,956 A | 7/1980 | Ubbelohde | |
| 4,234,386 A | 11/1980 | Stirling | |
| 4,320,709 A * | 3/1982 | Hladun ......................... | 110/235 |
| 4,357,183 A | 11/1982 | Fan et al. | |
| 4,369,042 A | 1/1983 | Schafer et al. | |
| 4,412,841 A | 11/1983 | Du Broff et al. | |
| 4,465,556 A | 8/1984 | Bowen et al. | |
| 4,475,924 A | 10/1984 | Meyer | |
| 4,477,257 A | 10/1984 | Koppelman et al. | |
| 4,582,454 A | 4/1986 | Brandenburg | |
| 4,601,728 A | 7/1986 | Dungs et al. | |
| 4,661,119 A | 4/1987 | Andersson et al. | |
| 4,780,136 A | 10/1988 | Suzuki | |
| 4,908,167 A | 3/1990 | Beckmann et al. | |
| 4,976,940 A * | 12/1990 | Paulson ..................... | 423/648.1 |
| 5,076,297 A | 12/1991 | Farrier et al. | |
| 5,125,931 A | 6/1992 | Schulz | |
| 5,264,007 A | 11/1993 | Lask | |
| 5,285,735 A | 2/1994 | Motoi | |
| 5,516,356 A | 5/1996 | Schmit | |
| 5,542,962 A | 8/1996 | Ollerenshaw et al. | |
| 5,609,959 A | 3/1997 | Hamaguchi et al. | |
| 5,752,993 A | 5/1998 | Eatough et al. | |
| 5,807,420 A | 9/1998 | Eatough et al. | |
| 5,912,403 A | 6/1999 | Bilke | |
| 5,916,826 A | 6/1999 | White | |
| 5,955,375 A | 9/1999 | Zondlo et al. | |
| 6,436,168 B1 | 8/2002 | Uematsu et al. | |
| 6,719,956 B1 | 4/2004 | Gaur et al. | |
| 7,524,795 B1 * | 4/2009 | Lima et al. .................... | 502/432 |
| 7,754,179 B2 * | 7/2010 | Lueking et al. ............... | 423/446 |
| 8,110,169 B2 | 2/2012 | Gaur et al. | |

OTHER PUBLICATIONS

Roberts & Caserio, 'Basic Principles of Organic Chemistry' 2nd ed. p. 358 1977 (no month).*
Office Action dated Oct. 22, 2010 for related U.S. Appl. No. 10/824,263, Gaur et al. (6 pages).
Notice of Allowance issued in related U.S. Appl. No. 12/512,722 Gaur et al., mailed Oct. 19, 2010 (7 pages).
Office Action dated Jun. 8, 2011 for related U.S. Appl. No. 10/824,263, Gaur et al. (7 pages).
Office Action in related U.S. Appl. No. 13/367,231 dated Apr. 24, 2013 (6 pages).
Carbon Alloys. "Novel Concepts to Develop Carbon Science and Technology" by E. Yasuda, M. Inagaki, K. Kaneko, M. Endo, A. Oya and Y. Tanabe, published Apr. 2003.
"Thermal Data for Natural and Synthetic Fuels" by Siddhartha Gaur and Thomas B. Reed, published in 1998.
"1999 Annual Book of ASTM Standards" Section 5, Petroleum Products, Lubricants, and Fossil Fuels, vol. 05.05 Gaseous Fuels; Coal and Coke, pp. 310 and 311.

(Continued)

*Primary Examiner* — Stuart Hendrickson
(74) *Attorney, Agent, or Firm* — Osha Liang LLP

(57) ABSTRACT

A carbonaceous material substitute product for blast furnace metallurgical coal and method of making the carbonaceous material is disclosed. A metallurgical coal substitute material is made from non-metallurgical grade coal or other carbon sources.

2 Claims, 5 Drawing Sheets

(56) References Cited

OTHER PUBLICATIONS

"Coal Preparation", editor Joseph W. Leonard, III, associate editor Byron C. Hardinge, Fifth Edition, Published by Society for Mining, Metallurgy, and Exploration, Inc., Littleton, Colorado 1991, pp. 547 and 548.

"Chemistry" by Raymond Chang, Copyright 1981 by Randon House, Inc., pp. 258 and 259.

"P-075U Optimization of Mechanical Properties of Thermoplastics Through Alloying" by Larry Wang, pp. 1 through 7.

Polymer Development Through Blending and Alloying Search-In-Print 2002, ISBN: 0-88387-178-5.

"High Temperature Alloy Design and Theory & Design of Monolithic and Dual Phase Alloys Based on Laves Phases", 2 pages.

"Mechanical Alloying", 2 pages.

"Production of Thermoelectric Materials by Mechanical Alloying Extrusion Process", 5N Plus Inc., Saint-Laurent (Quebec), Canada; Ecole Polytechnique de Montreal, Montreal (Quebec), Canada, 1 page.

35 Cryogenic Mechanical Alloying of Poly (ether ether ketone) Polycarbonate Composite Powders for Selective Laser Sintering, 2 pages.

Alloying Global and Local Branch History: Taxonomy, Performance, and Analysis by K. Skadron, M. Martonosi, and D.W. Clark, Tech Report TR-594-99, Princeton Dept. of Computer Science, Jan. 1999, 1 page.

"Interaction between carbon/nitrogen and substitutional alloying elements" by Hiroshi Numakura, Computer assisted microstructure control of steels equilibrium and kinetic aspects, Iron and Steel Institute of Japan, 2000 no month, 1 page.

Coal, Wikipedia, Feb. 2009, pp. 1-14.

Tuyere, Wikipedia, Feb. 2009, 1 page.

Hot blast, Wikipedia, Feb. 2009, 1 page.

2A2. Pulverized Coal Injection for Blast Furnace (PCI); Iron Making and General Industry Technologies (Iron Making Technologies); Shinjiro Waguri; Ferram vol. 8, p. 371, 2003 no month, 2 pages.

Tither et al. The Characterization of Ultra-Hard Carbon Films Produced from Pre-Processed Carbon Powder in a Hybrid Physical Vapor Deposition System in CARBON vol. 28 #5 pp. 641-655, 1990 no month.

Tanabe et al. 'Carbon Alloys.' vol. 38, issue 2, 2000, pp. 329-334.

Blast Furnace Granular Coal Injection System Demonstration Project; Clean Coal Technology; Topical Report No. 15; Nov. 1999; 28 pages.

\* cited by examiner

Effect of Heating Rate
(Heated at 1, 4, 10, 40 and 100 °C/min)

Effect of Heating Rate

BLAST FURNACE METALLURGICAL COAL SUBSTITUTE PRODUCTS AND METHOD

RELATED APPLICATION

The present application is a continuation-in-part application of U.S. application Ser. No. 10/824,263, co-owned and co-pending herewith, that was a continuation of Ser. No. 09/663,115, filed Sep. 15, 2000 and issued Apr. 13, 2004 as U.S. Pat. No. 6,719,956, which are both incorporated herein by reference and relied upon for priority and all legitimate purposes.

TECHNICAL FIELD OF THE INVENTION

The invention is directed to blast furnace pulverized coal injection (PCI) and carbon product used for PCI injection.

BACKGROUND OF THE INVENTION

Blast furnaces for the production of pig iron are charged from the top with a stack of layers of burden material consisting of iron ore (sinter or pellet), coke, and fluxes such as limestone. Combustion is initiated and air is introduced or "blasted" upward as the oxidant for burning the coke, producing heat, and for smelting the iron from the ore. The fluxes combine with the silica in the ore so that it is removed as slag. The iron bearing ore provides the desired end product. The coke provides the fuel, acts as a reducing agent in the smelting process and also maintains porosity in the blast furnace stack for the combustion and exchange of heat and flow of iron downward. One of the primary limitations placed upon blast furnace throughput is the furnace working volume and, if the quantity of coke being charged can be reduced by introducing an acceptable alternative fuel; more of the working volume may be the iron ore so that a higher iron bearing material results in a higher output. In particular, skip charged furnaces which at present have a limit on the charge rate, can benefit from using less coke. However, the coke provides at least the important functions to provide the fuel for the process, to act as a reducing agent and to provide porosity in the stack so that the flow of the process can be maintained by preventing the stack from collapsing on itself and choking out the flow of air, heat and combustion, and iron material collection. The coke that that has the capability to act as a fuel, a reducing agent and also to provide the strength to maintain structural integrity during the process, and hence provide porosity in the blast furnace, has traditionally been produced by pyrolyzing metallurgical grade coal Several substitutes for a portion of the coke have included injection of petroleum fuel products, heavy petroleum and natural gas as a fuel substitute. As a result of increases in petroleum cost, it is sometimes cost effective for a blast furnace to rely on all-coke operation that reduces that amount of injection of heavy oil.

In recent years several attempts have been made to inject crushed or pulverized coal in blast of air through the tuyeres of the blast furnace. By this technique, up to 20% of the coke charge has been replaced by coal injection, thus allowing higher production rates and reduced fuel costs. The cost of coke is generally about twice the cost of metallurgical coal used to make coke such that a significant cost savings can be realized.

Research and studies are currently under way on ways to enhance operation of blast furnaces by injection of an air carried pulverized fuel such as nodular coal or fine coal powder in a processes known generally known as Pulverized Coal Injection (PCI) to reduce the consumption of costly coke, petroleum fuel, or other fuel sources that have a higher cost than the coal. However, the pulverized fuel, such as particulate coal or fine coal, or the like, can have drawbacks in that it may have a low combustion rate as compared with other more expensive fuel such as natural gas or heavy oil, it may also contain other components such as moisture and ash that can interfere with the process and it may contain volatile components that can result in increased pollution.

In a heavy oil injection operation, the tip end of a burner is located in the vicinity of the boundary between a tuyere of a blast furnace and a blow pipe so as to burn the injected fuel completely in a raceway immediately downstream of the tuyere. However, if a slow burning pulverized coal fuel is injected at the same position, as the fast burning oil it is difficult to burn the pulverized coal fuel completely within the tuyere and raceway, resulting in lower combustion efficiency.

Moving the injection position further upstream has been considered as a way to improve the situation associated with slow burning injection coal. The longer distance gives the fuel a longer time to burn. Relocating the coal injection point is not a complete solution because pulverized coal fuels may also have a significant ash content (primarily silica), which ash will be fused by the combustion heat and will tend to deposit or accumulate on the inner surfaces of the longer blow pipe upon collision there against. This can narrow the blow passage and can make it difficult to continue a stable fuel injecting operation. There is also a possibility of the ash deposit destabilizing the hot air blowing through the tuyere. The amount of ash deposition or accumulation increases if the injecting position is located in a more upstream position.

It is known in the metallurgical arts to use the injection of coal dust or coal granules into a blast furnace to supply additional fuel for increasing the efficiency of smelting of iron ores for steel making in blast furnaces. It has been preferred by some to use granules instead of powder to burn in the blast furnace environment because the use of granules both reduces the costs associated with pulverizing coal to powder and also avoids the tendency for the powder to pack and clog passageways. One coal injection process has become known to some in the industry as Blast Furnace Coal Granule Injection (BFGCI).

It has been found that some of the problems associated with coal injection processes can be improved significantly by using a high grade coal sometimes known as metallurgical grade coal.

Metallurgical coal is the type of coal that can be used to produce metallurgical coke. Metallurgical grade coal is typically high grade bitumous coal. Metallurgical coal generally has a Free Swelling Index (FSI) of about 8 or 9. These types of coal have a high carbon content (more than about 60% and generally about 80%) corresponding to low volatile content of about 20% and low ash and impurities content, sometimes as low as 4 or 5%. Bitumous coal includes carbon compounds that are primarily composed of $sp^2$ bonded carbon. Metallurgical coal also has a low or moderate moisture content and low ash content. The burning rate is generally lower than some of the other types of coal because the reaction rate for $sp^2$ bonded carbon is slower than for other types of carbon compounds, for example carbonaceous material that has more than about 50% $sp^3$ carbon bonds and thermal coal thermal coal having at leas more than 50% $sp^3$ carbon bonds or that primarily has $sp^3$ carbon bonds.

Thus, while metallurgical grade coal is used in making the coke, it has also been used in PCI for a number of reasons including efficiency and reduced pollution. The supply of such high grade metallurgical coal is relatively scarce compared to other types of coal or carbonaceous material and thus metallurgical coal is generally more expensive than other types of coal and many other types of carbonaceous.

SUMMARY OF THE INVENTION

One or more embodiments of the invention relate to an improved substitute fuel for metallurgical grade coal used in blast furnace iron production and a method producing a substitute for metallurgical grade coal used in blast furnace pulverized coal injection (PCI) process.

According to one or more embodiments a method is disclosed for using a carbon material substitute for metallurgical coal normally used to make coke, to reduce costs and a method of manufacturing such substitute carbon material. Particularly, a method to manufacture a carbon product formed from base carbonaceous feed material (virgin or refuse) such as thermal coal that is not as expensive as metallurgical coal.

BRIEF DESCRIPTION OF THE DRAWINGS

The characteristics and advantages of an embodiment of the present invention may be better understood in reference to the accompanying specification including the detail description, the claims and the following drawings, wherein like reference numerals designate like elements and in which:

DETAILED DESCRIPTION OF THE INVENTION

While the present invention may be embodied in many different forms, for the ease of description, this detailed description and the accompanying drawings disclose only specific forms as examples of the invention. Persons with ordinary skill in the relevant art will be able to adapt the invention to apply to other forms not specifically presented herein, based upon this description.

Figure 1:
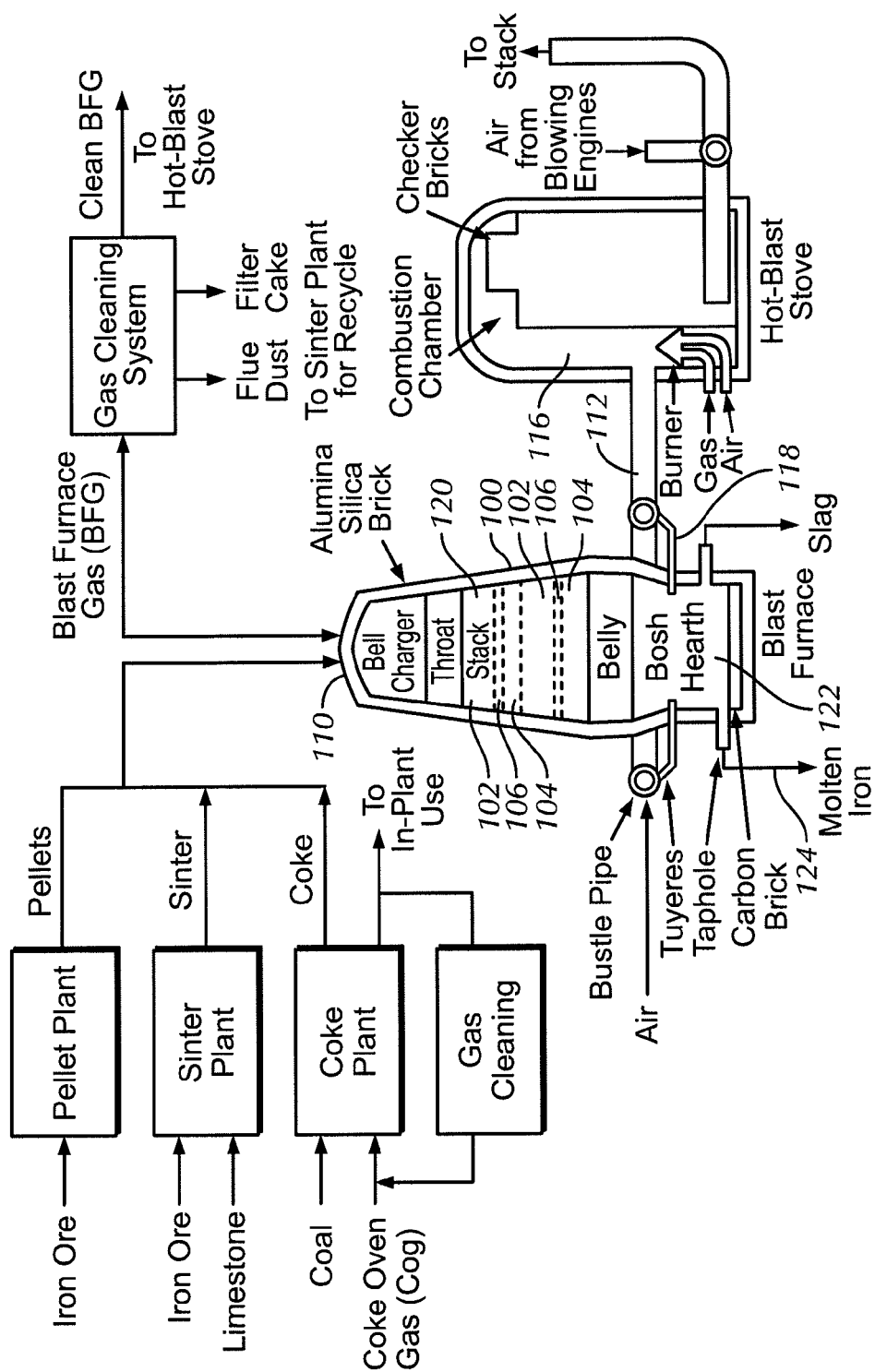
FIG. 1 (prior art) is a schematic diagram depicting a blast furnace with pulverized coal injection (PCI) in which the present invention is useful.

The traditional blast furnace process for extracting iron from iron ore is shown in FIG. 1. A blast furnace is basically a shaft or column furnace 100 in which iron ore 102, coke 104, and limestone flux 106 are loaded at the top 110 and air 112 is injected at the bottom 114 that reacts with the coke to produce heat that flows upward through the charge of ore, coke and flux. A series of known chemical reactions reduce the iron ore that consists of various iron oxides to molten iron (Fe). The molten iron is collected at the bottom of the furnace and removed form the furnace for further processing such as making steel. Hot air from a hot blast oven 116 is injected through tuyeres 118 located in the sides of the furnace below the stack 120 and above the hearth 122. A complex set of reactions are initiated as described below. Oxygen in the injected air reacts with the coke to produce heat to maintain the reaction process:

$$C + 0.5\,O_2 \rightarrow CO \tag{i}$$

The carbon monoxide rises through the blast furnace and reduces the iron ore as follows:

$$Fe_2O_3 + CO \rightarrow 2FeO + CO_2 \tag{ii}$$

$$Fe_2O_4 + CO \rightarrow 3FeO + CO_2 \tag{iii}$$

$$FeO + CO \rightarrow Fe + CO_2 \tag{iv}$$

Some of the carbon dioxide also reacts with the carbon to further facilitate the reactions above:

$$CO_2 + C \rightarrow 2CO \tag{v}$$

Calcination of limestone produces calcium oxide. The calcium oxide reacts with non-ferrous oxides of alumina oxides and silica oxides found in the iron ore. The calcium oxide also reacts with sulfur that may be found in the coke. These materials are removed as molten slag:

$$CaCO_3 \rightarrow CaO + CO_2 \tag{vi}$$

$$2CaCO + Al_2O_3 + SiO_2 \rightarrow Ca_2OAl_2 + SiO_7 \tag{vii}$$

$$S + CaO + C \rightarrow CaS + CO \tag{viii}$$

When supplemental fuel is used, such as heavy oil or natural gas, it may be injected in through the tuyeres and it results in the formation of both hydrogen and carbon monoxide:

$$CH_4 + 3/2\,O_2 \rightarrow CO + 2H_2O \tag{ix}$$

$$2H_2O + C \rightarrow CO + H_2 \tag{x}$$

The hydrogen can act as a reducing agent, however a couple of drawbacks are that water is formed instead of $CO_2$ and requiring additional heat to evaporate the water, and some of the CO and $H_2$ that does not react may be released as pollution or will need to be collected in at the top of the furnace.

It will be understood that the resulting iron (Fe) 124 is ultimately obtained as indicated in the chemical equation (v) above. Carbon from the coke combines with oxygen in the hot air blast, (or carbon from the coke combines with carbon dioxide). Carbon from the coke is a key part of the process. Although hydrocarbon fuels have been used to partially supply fuel in place of coke, such fuels in most locations are more expensive, and will require an additional amount of heat to offset the heat of evaporation of water that is also formed when hydrocarbon fuel is used instead of coke and can cause additional pollutants.

Figure 2:
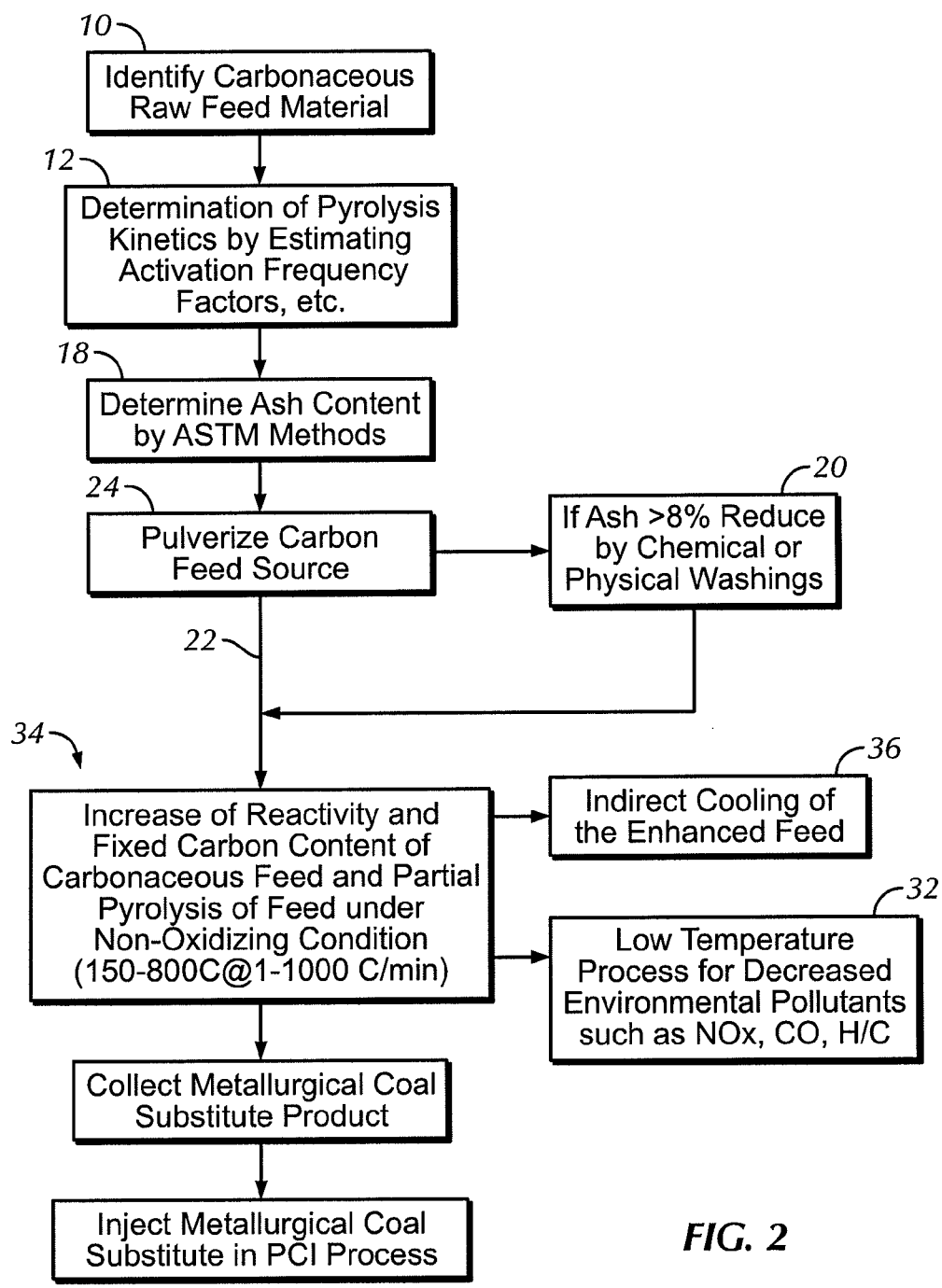
FIG. 2 is a schematic diagram depicting the flow of steps in the process of the Invention.

As illustrated in FIG. 2, an embodiment of the multiple-stage process of an embodiment of the present invention is directed to the production of metallurgical coal substitute that could substitute as fuel in various applications, including but not limited to blast furnace applications. An aspect of this invention relates to the production of carbonaceous materials having desired content or characteristics for use in a blast furnace to substitute for high grade metallurgical coal.

The multiple-stage process of FIG. 2 for the production of the metallurgical coal substitute is accomplished without the use of virgin metallurgical grade coal as feed material. Instead, an embodiment of the invention is directed towards enhancing the rank and quality of low cost, low rank coal, and possibly even waste carbonaceous materials, by forming a coal substitute having properties of metallurgical grade coal that are beneficial for use in blast furnace coal injection. The metallurgical coal substitute is tailor made based on the processing to convert the properties of the feed material or various feed materials selected as the feed source. The process may utilize various different carbon sources and combinations depending upon properties of the metallurgical coal for which the resulting material will be a substitute. For example, in one or more embodiments some of the feed materials may be thermal coal, sub-bituminous coal, lignite, refuse coal, coal tailings, steaming coal, agricultural residues, polymeric wastes, agricultural wastes, polymeric wastes, non-coking coals, non-caking coal fines, caking coals, degraded polymers, refuse carbonaceous materials from tires, other refuse carbonaceous materials, municipal solid with or without inorganic components and even non-metallurgical bitumous coal that might not meet the standards for the production of metallurgical coke. Applicants have found carbon materials that have high fractions of $sp^3$ carbon bonds are useful for low costs and for the increased reactivity of the $sp^3$ carbon bonds.

The burning rate of metallurgical coal is generally lower than for some of the other types of coal. Bitumous coal is primarily composed of $sp^2$ bonded carbon compounds and the reaction rate for $sp^2$ bonded carbon is slower than for other types of carbon compounds, for example carbonaceous material that has more than about 50% $sp^3$ carbon bonds, such as sub-bituminous coal or thermal coal having more than 50% $sp^3$ carbon bonds or that primarily has $sp^3$ carbon bonds. In this regard, the inventors have found that it is useful to select thermal coal as the feed material for making a metallurgical coal substitute, so that the substitute may have enhanced properties for purposes of PCI over metallurgical coal. It should be observed that the relative rates of burning referred to above is with respect to the carbon and is not with respect to the hydrocarbon volatiles that may be initially more abundant in thermal coal than in metallurgical coal. The volatiles will be largely removed according to one or more embodiments of the inventive process described and as claimed herein.

Choosing thermal coal as a source of carbon for PCI blast furnace processes over metallurgical coal as the source is useful for logistical purposes. In this regard logistical purpose includes the logistic availability of the thermal coal in greater abundance in locations such as in the US. Also, the choice of thermal coal as a substitute for metallurgical coal for this purpose eases the burden on the already short supply of metallurgical coal. The available limited supply of metallurgical coal can be used to supply the need for uses such as for making of coke that is still required even with the use of PCI in blast furnaces.

Pyrolysis Kinetics and Thermal Behavior

As detailed below and referring to FIG. 2, a multiple-stage process of an embodiment of the present invention includes the selection, at 10, of starting material based on the property requirements of the metallurgical coal substitute. This selection is done by determining, at 12, the partial pyrolysis kinetics and its effects on changes in the physical and chemical structure of the carbon based feed material. An example of the partial pyrolysis kinetics and thermal behavior is given in graphical form in FIG. 2. One aspect of the pyrolysis kinetics shown in FIG. 2 is the rate of conversion of solid carbonaceous substance that is illustrated by curve 14 as a function of temperature at a given heating rate. The initiation temperature 16 and the slope of the curve 14 help in the understanding and determining of the partial pyrolysis kinetic behavior for the solid carbonaceous substance.

Once the kinetics and thermal behavior of the feed material are understood, and their effects qualitatively and quantitatively established, the effects of inorganic ash are also established, at 18 of FIG. 2. One of the kinetic characteristics affected by the partial pyrolysis of the process is the reactive surface of the carbonaceous material. For example, the ingredients in ash help characterize the reactive surface of the partially pyrolyzed carbon. The ash content has its own physical effects. In a metallurgical coal substitute for blast furnace powder coal injection (PCI) ash content of less than the ash content of a metallurgical coal is important to avoid excess buildup in the injection passages. A metallurgical coal may usefully have ash content a range of about 1%-10%. If the ash content in the source (or combined sources) of carbonaceous material feed is determined to be less than a desired amount (for example, if at least below 10% ash for the metallurgical coal to be substituted), the process may proceed at 22 of FIG. 2. If the ash content needs to be reduced or modified this can be done by various techniques such as physical doping and separation, chemical wash, physical wash, or combinations thereof as at 20.

Pulverizing the Carbonaceous Feed Material

It is useful for the carbonaceous feed material to be in a pulverized condition and if it is not obtained in a pulverized condition will be pulverized at 24 to facilitate processing and also for use of the resulting carbon product in PCI processes. Pulverization will facilitate washing if the ash content needs to be adjusted by physical or by chemical washing. Physical washing can be more rapidly and completely accomplished with smaller particle sizes. Similarly, chemical washing for reducing ash content is also facilitated when the particle size is small. Moreover, even when the feed material has sufficiently low ash content, the subsequent processes will be facilitated by having a finely pulverized carbonaceous material.

It has been found by the inventors that the effectiveness of PCI is also enhanced by fine particle size so that burning is faster when the resulting metallurgical coal substitute is injected into a blast furnace. For example, particle sizes that will pass through standard mesh sizes in a range of about 100-300 mesh have been used in PCI processes using pulverized metallurgical coal. Thus, the energy used to pulverize or grind the carbonaceous material for initial processing purposes will also be beneficial for a final product to be used in PCI for a blast furnace. Previously, thermal coal was not as useful as metallurgical coal for PCI because of a generally high volatile content, high moisture content, and a high ash content associated with most available thermal coal. The benefit of increased reaction rate due to a higher percentage of $sp^3$ carbon bonds was not generally considered in view of the other deficiencies for purposes of PCI processes. Applicants have found that injection of pulverized thermal coal with a high volatile content could result in incomplete burning of the carbon, because the flame face of burning volatiles combine with the oxygen in the air surrounding the carbon particles and effectively "insulate" the carbon particles from the oxygen and thus from combustion. This can have two significant drawbacks. The heat energy in the volatiles is not sufficient for the process (and is often inconsistent) and without burning the carbon and the unburned or partially burned carbon particles in a PCI process travel up the stack and the carbon particles that make it through the charge in the stack are exhausted from the blast furnace as increased pollution. A large percentage of the carbon particles that are not fully burned will become logged in an among the charge materials or will otherwise fill the spaces and reduce permeability required for upward flow of air thereby increasing the pressure in the furnace. Reduced flow slows the reaction and causes inefficiencies. When the pressure in the furnace raises to an unacceptably high pressure actions must be taken to reduce the pressure and avoid potentially catastrophic damage to the furnace itself.

It has also been found by the inventors that a high moisture content of the carbon particles used in PCI processes can cool the blast furnace and potentially interfere with the blast furnace process. In one or more embodiments the moisture content of the feed source can be usefully reduced by the heating or partial pyrolysis of the processed carbonaceous feed material to about 10% moisture content or less.

Ash Reduction and Modification

The carbonaceous material may be obtained in a powder form; such as in the form of carbon dust or other fine material. Alternatively, the carbonaceous source material may be obtained in larger sizes as for example lump coal or coal nodules as it is mined. If the carbon source is not already in a fine powder form it will be pulverized or ground to a particle size appropriate for efficient processing. For example, a fine grain size that will pass through a 200 mesh or smaller size may be obtained. As explained further below, in accordance with one or more embodiments of the invention energy and cost savings may be obtained in some cases by less grinding to obtain a larger particle size that will function as well as smaller grain metallurgical coal because of the increased reactivity that may be obtained for the carbon particles. If the ash content is higher than desired, it is reduced by washing and other conventional processes. For example, some carbonaceous refuse used for feed material may have high initial ash content, ranging from 15-30% by weight. Ash content may be reduced by known techniques, including washing, cell flotation, and gravity separation. In some applications the ash content will be reduced to no greater than about 8% to 10%. For a very high grade metallurgical coal substitute, the ash content may be adjusted to a lower level of about 1-4%.

For reasons of lowering the cost for reducing the ash content, starting feed material with ash content less than about 20-25% is preferable. A multiple-stage ash reduction process may yield acceptable products using initial feed materials of higher ash content (to 35-40%).

Alteration of Reactivity

It will be understood by those of ordinary skill in the art that metallurgical coal is bituminous coal that is primarily composed of $sp^2$ bonded carbon, has a volatiles content of about 20% and has a free swelling index (FSI) of about 8-9 FSI. This type of coal is good for converting to steel making coke because of its strength and high carbon content characteristics. Metallurgical coal it is relatively expensive because it is in high demand and short supply in most countries, including, in the United States. According to aspects of the invention, to facilitate fast burning of the carbon, the reactivity of the carbon material is enhanced in part by selection of feed source material that is primarily or at least has a high percentage of $sp^3$ bonded carbon. The reactivity and thus the burning rate is also increased by processing the carbon feed source with mechanical processing and with heat in a controlled atmosphere. The mechanical 24 and heat 34 processing has been found by applicants to increase the reactivity of the carbon feed material whether it is $sp^2$ or $sp^3$ bonded carbon material.

According to one or more embodiments of the invention an increase in reactivity is accomplished by increasing the surface area of the carbon particles. Initially, the surface area per volume of carbon is increased by pulverizing the particles to a smaller size. In the case of thermal coal as the source material the energy required to pulverize the material is generally lower than it would be for metallurgical coal. A thermal coal will typically have a higher Hargrove Grindability Index (HGI) that a typical metallurgical coal. A higher the HGI number, on a scale of 0-100, means the material is easier; it takes less energy, to grind or pulverize. Metallurgical coal is of a type with structural integrity so that it is rare to find metallurgical coal that also has a high HGI.

In addition to increasing the total surface area of the carbon material by decreasing the particle size, the surface area and hence the reactivity of the carbon is also increased by increasing the porosity and by increasing the internal void volume. With increased internal void volume, rapid combustion continues throughout the burning process as the external surface is burned off. Thus, it has been found by the inventors that an increase in reactivity is based upon exposed surface area and internal voids. This can be accomplished by partially pyrolyzing the carbon base material at 24 of FIG. 1.

Partial pyrolysis comprises the application of heat in a non-oxidizing environment and thus requires both the control of the atmosphere and the addition of heat to effectively boil, evaporate and drive off the volatiles. Quickly driving off the volatiles advantageously leaves pores and internal voids in the particulate materials. The feed material was previously pulverized and subjected to any required reduction in ash, and at this stage the finest parts of the pulverized carbon feed material is physically transformed to sponge-like particulate structure. Increased surface area is provided with a large presence of micro pores. This results in a large increase in surface area and a corresponding increase in the reactivity. High reactivity is particularly beneficial in the metallurgical coal substitute so that the rate of burning is increased. Chemically, the hydrocarbon fraction of the carbonaceous feed material undergoes a significant reduction, and a portion of the hydrocarbon fraction undergoes thermal cracking. This results in the formation of carbon deposits on the surfaces of the carbonaceous particles, thereby increasing the fixed-carbon content of the carbon material.

Figure 3:
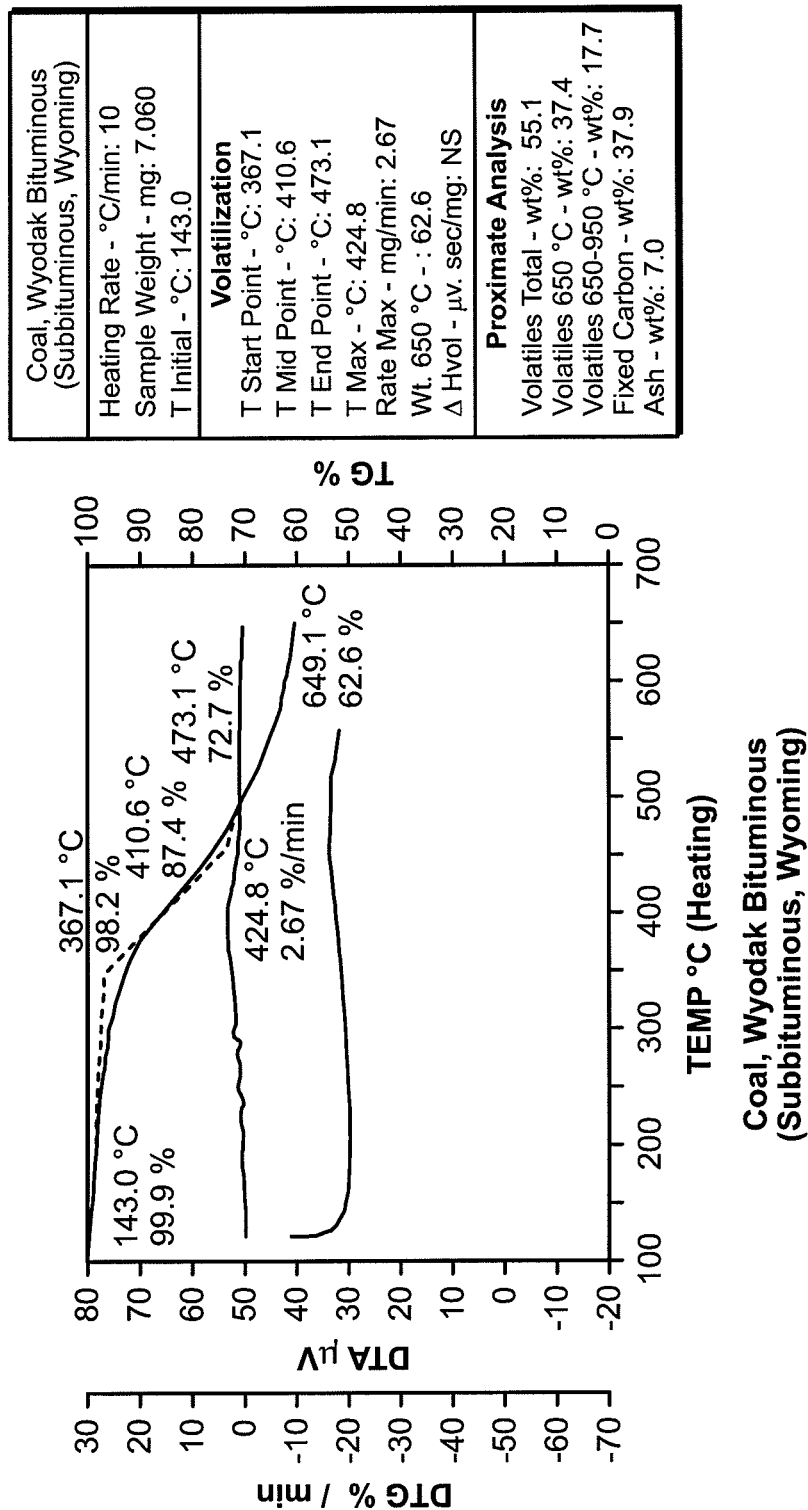
FIG. 3 shows an example thermogram for sub-bituminous thermal coal as usable source of carbonaceous feed material selectable for its characteristics according to one aspect of the invention.
Figure 4:
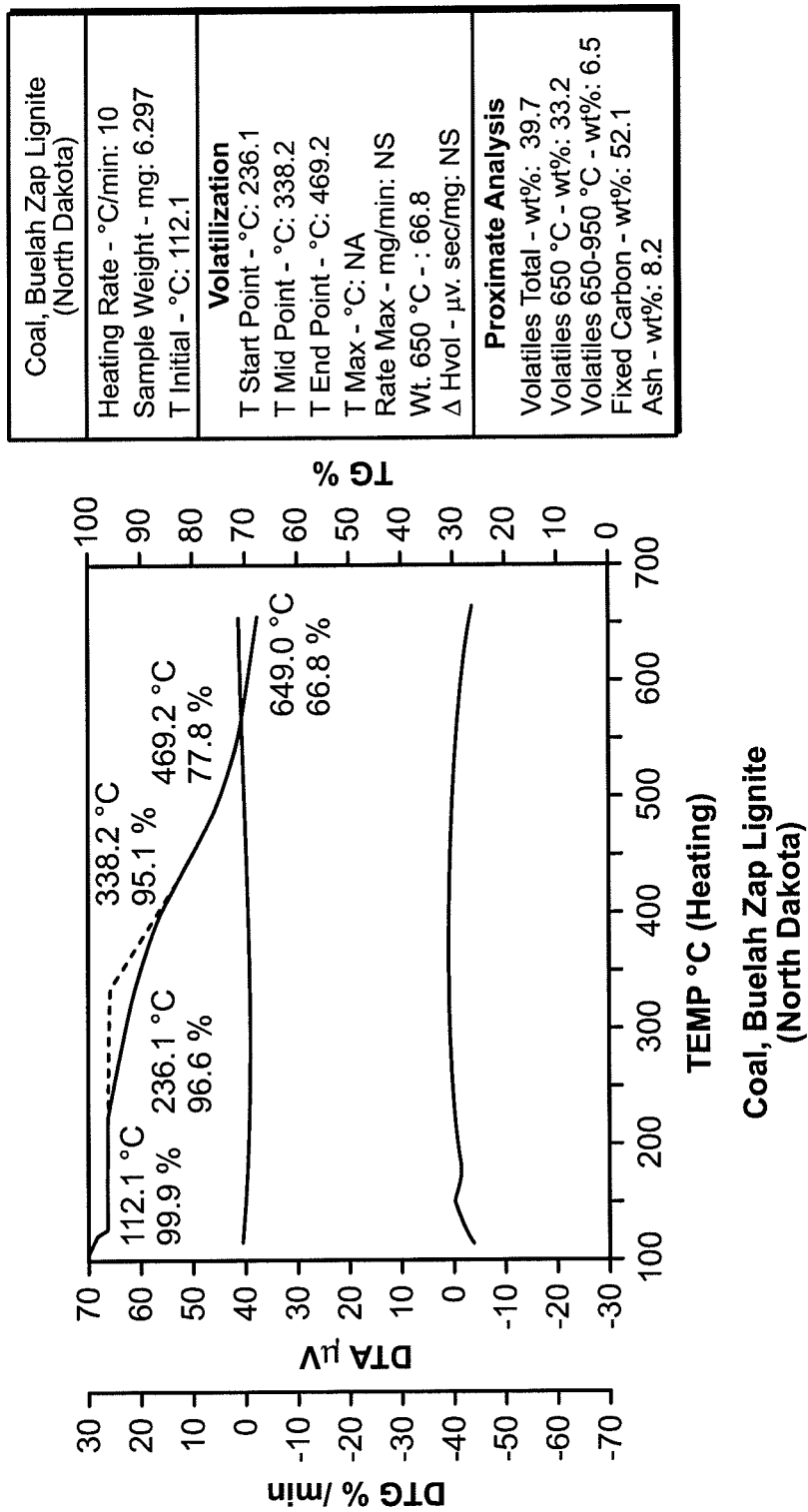
FIG. 4 shows an example thermogram for lignite as another usable source of carbonaceous feed material selectable for its characteristics according to one aspect of the invention.

The partial pyrolysis process may be usefully conducted in an inert environment within a low to moderate temperature range of 150-800° C., between the heating rates of 1° C./minute to 1000° C./minute, depending on the reactivity of the surface area requirement of the partially pyrolyzed carbon base. The necessary time, for which the material is retained at the heating temperature, also depends on the material and may vary from less than a few minutes to a few hours. For example, sub-bituminous Wyoming coal (FIG. 3) can be heated from 140° C.-473° C. at a heating rate of about 10° C./min, while North Dakota lignite (FIG. 4) can be heated from 236° C.-469° C. at 473° C. at a heating rate of about 10° C./min to about 200° C./min depending on the actual requirement of the reactivity. For this example, about 10° C./min is believed to provide a rate that will be sufficiently high to be useful in increasing reactivity and also sufficiently low to be cost effective. FIGS. 3 and 4 present conversion curves for the indicated materials under inert atmosphere at selected heating rates. These types of coal as carbon feed sources are only examples, and those skilled in the art will understand that similar information is available for other types of coal, particularly thermal coal as well as other possible carbonaceous feed materials.

Changes in the temperature range and the heating rate affects the reactivity and the surface area, and the agglomeration properties of the feed materials. The appropriate reactivity and temperature range is determined by the application of one of the following kinetic rate equations:

$$dX/dT = (A/a_i)(a_f/a_o)^m \exp(-E/RT_i) f(X)^n \tag{xi}$$

$$dX/(1-X)^n = A/a \exp(-E/RT) dT \tag{xii}$$

Where: A=Pre exponential factor

Figure 5:
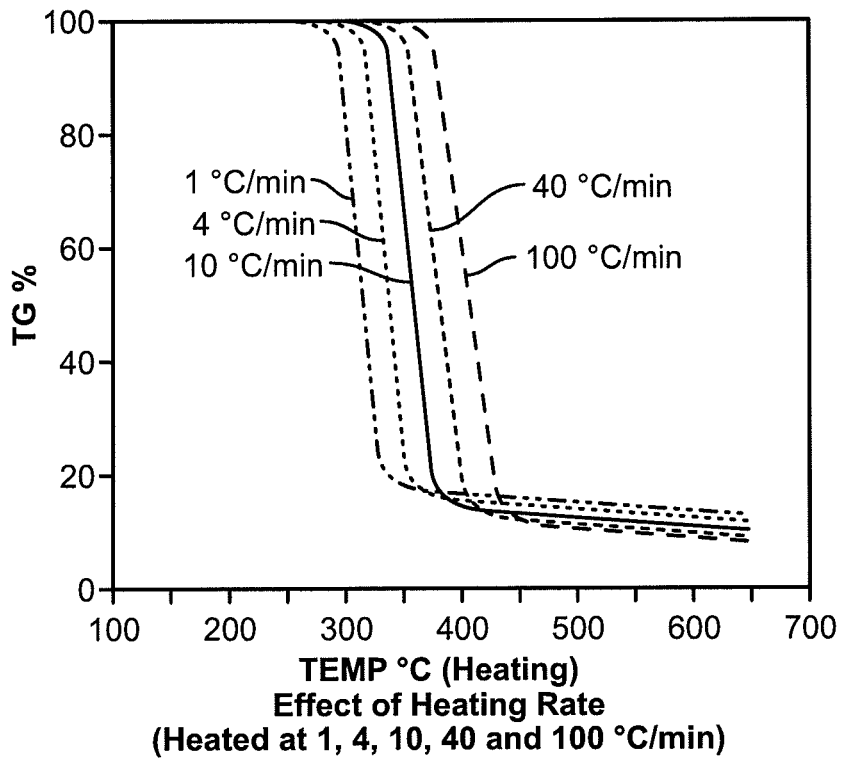
FIG. 5 shows an example of the effect of heating rate on the temperature for the reaction.
Figure 6:
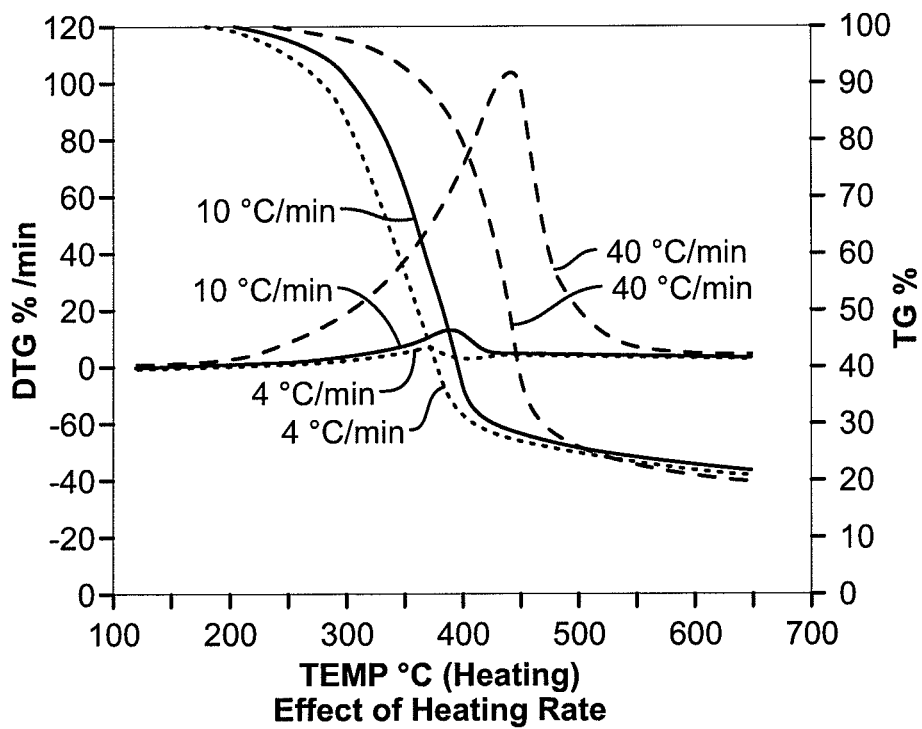
FIG. 6 shows an example of the effect of heat rate on the rate of devolatilization.

E=Activation energy
ai=The applicable heating rate
ao=The heating rate at which the kinetics is known
R=The universal gas constant
T=Temperature
X=Conversion factor
n=Reaction order
m=Empirical exponent FIG. 5 shows the effect of heating rate on the temperature for the reaction. This change in temperature leads to change in the reactivity and the surface area of the carbon feed base and the feed enhancer added during the enhancement stage of this process. The reactivity of the carbon base increases with the increase in the heating rate and vice versa due to the effect of rate of devolatilization (FIG. 6). Hence, the selection of specific temperature, heating rate and the residence time and their combination is selected based on the needs of the reactivity, surface area, volatile content needed for the metallurgical coal substitute to be produced and the chosen feed material for the manufacture of such metallurgical coal substitute.

Decrease in Environmental Pollutants

In addition, evolution of chemical nitrogen and sulfur, and its binding with the inherent oxygen to form chemical and thermal $NO_x$ and $SO_x$ (the acid rain forming gases and listed EPA criteria pollutants), along with the formation of toxic components (like BTX and related chemicals) is the driving force in deciding the temperature for this primary step, and for deciding the rate and mode by which the heat is transferred to the carbon base particle.

The relatively low temperatures and residence times, at which this partial pyrolysis is conducted, as at 32 of FIG. 2, yields significantly smaller volumes of greenhouse gases due to reduced amount of fuel utilization, relative to volumes produced during high-temperature pyrolytic production techniques conventionally used to manufacture products like coke. In addition, since the formation of thermal nitrogen oxides ($NO_x$, $NO$, $NO_2$) is favored at temperatures greater than 700° C. combustion conditions, the formation $NO_x$ during this stage of an embodiment of the present invention is greatly reduced. Because $NO_x$ is an acid rain compound, reducing its generation is a significant advantage of the multiple-stage process of an embodiment of the present invention.

Several selectable aspects and characteristics can lead to the reduction of NOx. For example, selection of feed materials with low sulfur content reduces the resulting NOx production upon combustion of the resulting metallurgical coal substitute. Selection of temperature ranges for the process that are less than 700° C., at least for a majority of the process, leads to reduced $NO_x$ formation during those process. Selecting residence time in a range of four to eight hours, controlling the process atmosphere to provide reduced oxidant and reduced $CO_2$ environment and selecting heating indirect and convective heating mechanisms over conductive heating processes all lead to a reduction of pollutants from the processes such as $NO_x$, $SO_x$, BTX and greenhouse gases like $CO_2$, CO when compared with conventional methods used in the industry for coke making. The reduction in environmental pollutants makes this a clean, environmentally responsible process and reduced greenhouse gas emissions.

The application of convection heating provides its challenges due to the reactive nature of the carrier gases. This needs careful designing of the reactor vessel.

Evolved gases are led to in situ oxidation or are drafted out to the recirculated controlled oxidation chamber, where (in the presence of catalysts) these gases are nearly completely destroyed at low temperatures, minimizing the formation of acid rain gases. The oxidized gases are recycled to heat the new raw product stream or used for co-generation of energy.

The following is one example for the preparation of a metallurgical coal substitute that complements the above description. This particular example is directed to producing a metallurgical coal substitute that is useful as a coal substitute in a blast furnace. The generalized process and variations and combinations of them can be used for producing the desired characteristic of other desired metallurgical coal substitute materials as described above.

Step 1 Understanding Thermal Behavior and the Pyrolysis Kinetics of Low Rank Carbon Feed Source.

As a theoretical example, FIG. 3 shows a thermolysis curve for a low rank carbon based feed material, Wyodak sub-bituminous coal from the Powder River Basin region of Wyoming, USA. This geographic region in the US currently provides relatively inexpensive and available coal. This material is of low rank, high volatile content, high moisture, and has significantly reduced structural strength in comparison to standard metallurgical grade coal used in conventional processes for making coke. Based on the thermogram given in FIG. 3 the thermal breakdown of the sub-bituminous coal begins at about 367° C. with a rapid rate of volatile evolution at approximately 424° C. This rapid evolution of volatile gases leads to the formation of high porosity and increased reactive surface area in the carbon particulate structure useful for rapid combustion in a blast furnace PCI process. FIG. 3 shows the thermolysis of Wyodak sub-bituminous coal from Wyoming having the devolatilization process initiating at around 367° C., with the rapid rate of evolution reaching its maximum at around 424° C.

This material cost is low and there is a presence of $sp^3$ carbon bonding. The availability of the material is good, at least in the US, and the material is not well suited for traditional metallurgical coke production so that its use will not generally interfere with availability of metallurgical coal for coke making purposes. Hence, the selection of this material as the source feed for the preparation of metallurgical coal substitute may be useful to one or more embodiments of the present invention. In another example, there might be a mixture of two or more sources of carbon and the processing could be different for each or an average range of processing might be used for similar materials to address the properties of each material in one process.

Step 2 Ash Content Determination and Adjustment for a Low Rank Coal Selected as a Carbon Feed Source.

FIG. 3 shows that the ash content of a low rank carbon based feed material, Wyodak sub-bituminous coal from Wyoming may be about 7 wt %. This represents an ash content that is slightly greater than would normally be preferred in a metallurgical coal substitute for a PCI process. In this case the material may be usefully subjected to a chemical wash that will conveniently remove more than about 50% or more of the ash to adjust the ash content down to less than about 4 wt %, which is consistent with the ash content of a metallurgical coal. Although, more ash could be removed, it has been found that by improving the flow of the particulate matter with higher injection pressures, build up and clogging of inlet tubing and tuyeres that has been observed in some earlier PCI processes is not expected to be a serious problem in modern high pressure PCI processes. In the event that the PCI processes for which the substitute metallurgical coal material is intended is a relatively lower pressure system or otherwise requires lower ash content, this may also be accomplished.

The additional cost for reducing the ash content further may be balanced against the functional characteristics of a particular blast furnace.

The ash content of the source carbon feed would need to be reduced to meet the specifications for the metallurgical coal substitute to be used in steel industry. The requirement of ash in fuel coal for use in steel industry is in the range of 4-12 wt %. Since the ash content of the carbon feed source in the current example 7 wt %, this carbon sources might not require any ash reduction techniques for use as metallurgical coal substitute in some PCI processes. In general, most PCI processes can function better with lower ash content and where the process for reducing ash content is cost effective; the ash content might be reduced by about 50% to below 4% by washing or other methods as described herein.

Step 3 Alteration of Reactivity

The reactivity of low rank sub-bituminous coal from Wyoming increases with the liberation of volatile content at an enhanced rate of about 35 wt %/min of volatile liberation due to the formation of micro pores. This increased reactivity will increase the speed of burning of the metallurgical coal substitute. This increase in reactivity also provides sites suitable for carbon deposits.

Significant cost savings can be obtained by using applicants' process and by using the metallurgical coal substitute product produced for PCI processes. In one embodiment the invention includes selecting thermal coal as a carbon feed source, pulverizing the thermal coal carbon feed source, adjusting the ash content, heating and partially pyrolizing the carbon feed source in a controlled atmosphere to drive off volatiles and moisture and to increase the reactivity of the material with increased surface area and increased internal void volume. By using highly reactive, low volatile content, low moisture content and low ash content pulverized carbon in a PCI process the amount of coke used can be reduced. Because of the enhancements achieved by the present invention more than 20% of the coke can be replaced with the highly reactive pulverized coal. For example, assuming that coke cost about twice as much as metallurgical coal, replacing about 30% of the coke with metallurgical coal would save about 15% of the cost of metallurgical coke. In the present invention the cost of thermal coal is significantly less than the cost of metallurgical coal and the metallurgical coal substitute product is likely to be less than about one-half the cost of metallurgical coal even after the processing (noting that part of the processing including grinding of thermal coal is easier and thus less expensive than with metallurgical coal and the efficiency of burning all the coal is enhanced by increased reactivity). This should result in an additional savings of about 7.5% or more (15%/2=7.5%). Thus, a total saving for 30% coke replacement with the metallurgical coal substitute of the present invention should be about 22.5% or more of the cost of the coke. It is also noted that the volume of iron ore in the charge in any given blast furnace would be increased to provide additional cost benefit. It is theorized that by maximizing the selection for low cost thermal coal that can be efficiently processed and maximizing the reactivity of the substitute carbon product produced according the inventive process, use of the product in PCI processes may replace as much as 40% or more of the coke and as a result the cost savings could be as much as 30% or more of the cost of coke that would be replaced by the metallurgical coal substitute product. In addition to the theoretically calculated cost savings, the use of this substitute product derived from an available source of non-metallurgical coal is logistically useful to both use such available low rank source and also to avoid using higher rank metallurgical coal so that metallurgical coal may be more available for making metallurgical coke. Moreover, because the metallurgical coal substitute will burn more completely, the potential for blast furnace clogging resulting from unburned carbon particles will be reduced and the amount of pollution due to exhausting unburned carbon particles will also be reduced.

Although the foregoing description necessarily presented a limited number of embodiments of the Invention, those of ordinary skill in the relevant art will appreciate that various changes in the configurations, details, materials, and arrangement of the elements (herein described and illustrated, in order to explain the nature of various embodiments of the invention) may be made by those skilled in the art. All such modifications and additional applications remain within the principle and scope of the invention, as expressed herein in the appended claims.

What is claimed is:

1. A process to produce a metallurgical coal substitute from feed material for use in a pulverized coal injection (PCI) process for blast furnace production of iron from iron ore, comprising:

selecting a non-metallurgical coal carbon containing feed source as a carbon base for the metallurgical coal substitute to be produced;

pulverizing the feed source carbonaceous material;

controlling ash content of the feed source by measurement and adjustment to a low ash content wherein controlling ash content comprises reducing and modifying ash content of the feed source, and wherein the reducing and modifying ash content of the feed source results in an ash content within a range of about 1-4%;

partially pyrolizing the feed source by heating the feed source to a temperature below the melting point of carbon in an oxygen free atmosphere to drive off moisture and volatiles, and to increase the surface area and the internal void volume of the feed source material; and collecting resulting carbon material as a metallurgical coal substitute product suitable for pulverized coal injection into a blast furnace.

2. A process to produce a metallurgical coal substitute from feed material for use in a pulverized coal injection (PCI) process for blast furnace production of iron from iron ore, comprising:

selecting a non-metallurgical coal carbon containing feed source as a carbon base for the metallurgical coal substitute to be produced;

pulverizing the feed source carbonaceous material;

controlling ash content of the feed source by measurement and adjustment to a low ash content within a range of 1-8%;

partially pyrolizing the feed source by heating the feed source to a temperature below the melting point of carbon in an oxygen free atmosphere to drive off moisture and volatiles, wherein adjusting reactivity of the feed source comprises altering reactivity by heating and wherein thermal conversion occurs between about 150-800° C., at a heating rate of about 10-200° C./min to increase the surface area and the internal void volume of the feed source material; and collecting resulting carbon material as a metallurgical coal substitute product suitable for pulverized coal injection into a blast furnace.

* * * * *